United States Patent [19] [11] 4,332,168
Aberle et al. [45] Jun. 1, 1982

[54] RADIOMETER

[75] Inventors: Claus Aberle, Mannheim; James F. Ruger, Hoffenheim; Klaus-Peter Schulz, Heidelberg, all of Fed. Rep. of Germany

[73] Assignee: Eltro GmbH, Heidelberg, Fed. Rep. of Germany

[21] Appl. No.: 140,796

[22] Filed: Apr. 16, 1980

[30] Foreign Application Priority Data

Apr. 20, 1979 [DE] Fed. Rep. of Germany ....... 2915971

[51] Int. Cl.³ .............................................. G01J 1/56
[52] U.S. Cl. ................................................... 374/130
[58] Field of Search ............. 73/355, 170 R; 356/216; 250/234

[56] References Cited

U.S. PATENT DOCUMENTS 3,293,915 12/1966 Banca et al. ...................... 73/355 R
3,601,611 8/1971 Kendall, Sr. ......................... 73/355
4,171,911 10/1979 Aberle et al. ....................... 250/234

Primary Examiner—S. Clement Swisher
Attorney, Agent, or Firm—Michael N. Meller; Anthony H. Handal

[57] ABSTRACT

A radiometer has a concave mirror turnable about its optical axis and photoelectric converters which receive light waves reflected by the mirror and are mechanically coupled with the same. An interrupter disk is arranged in the path of the radiation which falls onto the mirror and has a side facing the mirror which is reflective. The converters are heated and a housing surrounds the mirror, the converters and the heater and is provided with a window located on the optical axis and permitting the admission of light to the mirror. An electronic circuit processes the various signals of the device. According to the invention the light-admitting window is arranged in the center of curvature of the hollow part-spherical mirror, which center of curvature is located behind or inwardly of the interrupter disk as seen in the direction of the incoming light. An arrangement is provided for producing a reference signal which is phase-locked with the rotation of the interrupter disk and a rectifier circuit of the electronic circuitry has a phase detector arrangement which is controlled by this reference signal.

2 Claims, 5 Drawing Figures

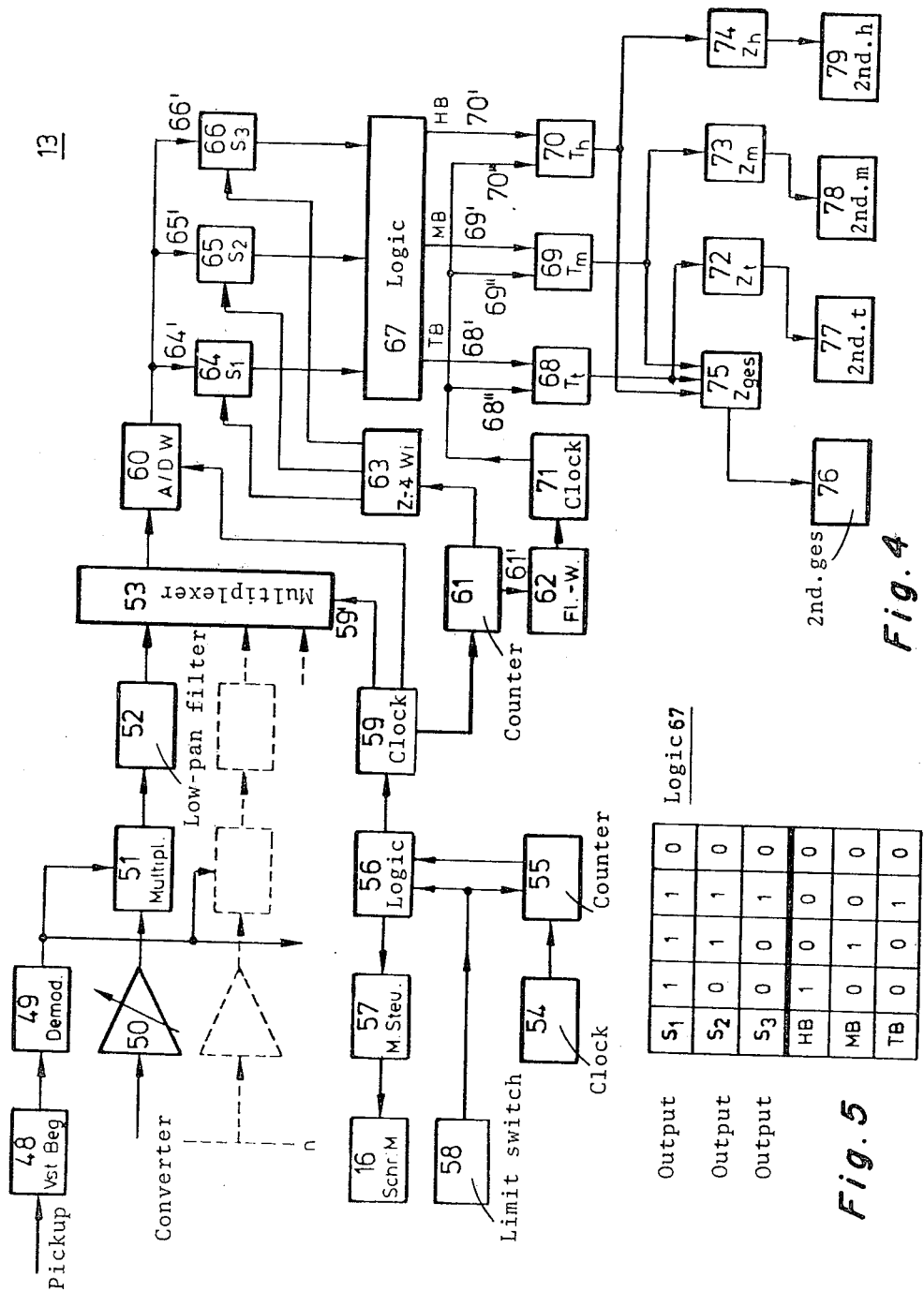

RADIOMETER

BACKGROUND OF THE INVENTION

The present invention relates to a radiometer.

More particularly, the invention relates to a radiometer of the type which is already known from German published application DE-OS No. 2,639,539 and from pending German application P No. 26 39 539.1.

Still more specifically, the invention relates to an improvement in a radiometer of the type mentioned above.

Radiometers of the type known from the prior art mentioned above, are basically perfectly acceptable instruments. However, instruments of this type are subject to reproduction errors resulting from the function-dictated location of the light admitting window, and the prior art contains no teaching as to how such errors can be avoided.

The book "Das Photographische Objektiv" by Johannes Fluegge, published by Springer-Verlag, Vienna, 1955, discusses on pages 190 to 196 the Schmidt camera and the Maksutov system, both of which use the so called Schmidt mirror. The book states that aberrations can be avoided if the light admitting windows of these devices are located in the center of curvature of the mirror. These light admitting windows are aspherically deformed windows.

SUMMARY OF THE INVENTION

It is an object of the present invention to improve the known radiometer in such a manner as to improve the imaging quality and the sensitivity (temperature resolution and reproducability of the measured values).

Another object of the invention is to achieve the above mentioned object in a relatively simple and uncomplicated manner.

In keeping with these objects and still others which will become apparent hereafter, one feature of the invention resides in a radiometer for measuring heat radiating from a defined spatial area, and this radiometer may—briefly stated—comprise a concave mirror shaped to resemble a segment of a sphere and mounted for turning movement about its optical axis. A plurality of photoelectric converters are provided, being mechanically coupled with the mirror and arranged in the path of rays reflected by the same. A rotating interrupter disk is interposed ahead of the mirror in the path of incident radiation and has a reflecting side facing towards the mirror. Means are provided for producing a reference signal which is coupled in phase-locked relationship with the rotation of the disk. Heating means are provided for heating the converters. A housing surrounds the mirror, the converters and the heating means and has a wall located ahead of the mirror and provided with an incident-light window located on the optical axis inwardly of the interrupter disk and arranged on the center of curvature of the mirror. Circuit means are provided, comprising amplifiers connected to receive signals from the converters, a rectifier circuit including a phase-detector circuit controlled by the reference signal and a low-pass filter circuit receiving signals from the rectifier circuit. Threshold value comparators and a multiplexer are operative to sequentially supply the rectified signals to the threshold value comparators.

With a construction, as just defined in accordance with the present invention, all rays of light or the light which enter through the center of the admitting window form with their associated tangent a right angle at the concave mirror. In other words, the radiation will impinge upon the mirror under always identical circumstances, from whatever angle it arrives. In a radiometer with a window which is located at the center of curvature and which additionally turns about this center of curvature, the admission window can be made small and be reproduced by the mirror in a ratio of 1:1. If the admission window were to be located at a different place, then the tangent angles would constantly change.

The invention will hereafter be described with reference to an exemplary embodiment. It is to be understood, however, that is by way of explanation only and is not to be considered limiting, the scope of protection sought for the invention being defined exclusively in the appended claims.

BRIEF DESCRIPTION OF THE DRAWING

FIG. 4 is a block diagram showing the electronic circuit of the radiometer in FIGS. 1-3; and FIG. 5 is a logic table showing the association of threshold value and the respective degree of sky coverage.

DESCRIPTION OF PREFERRED EMBODIMENTS

Figure 1:
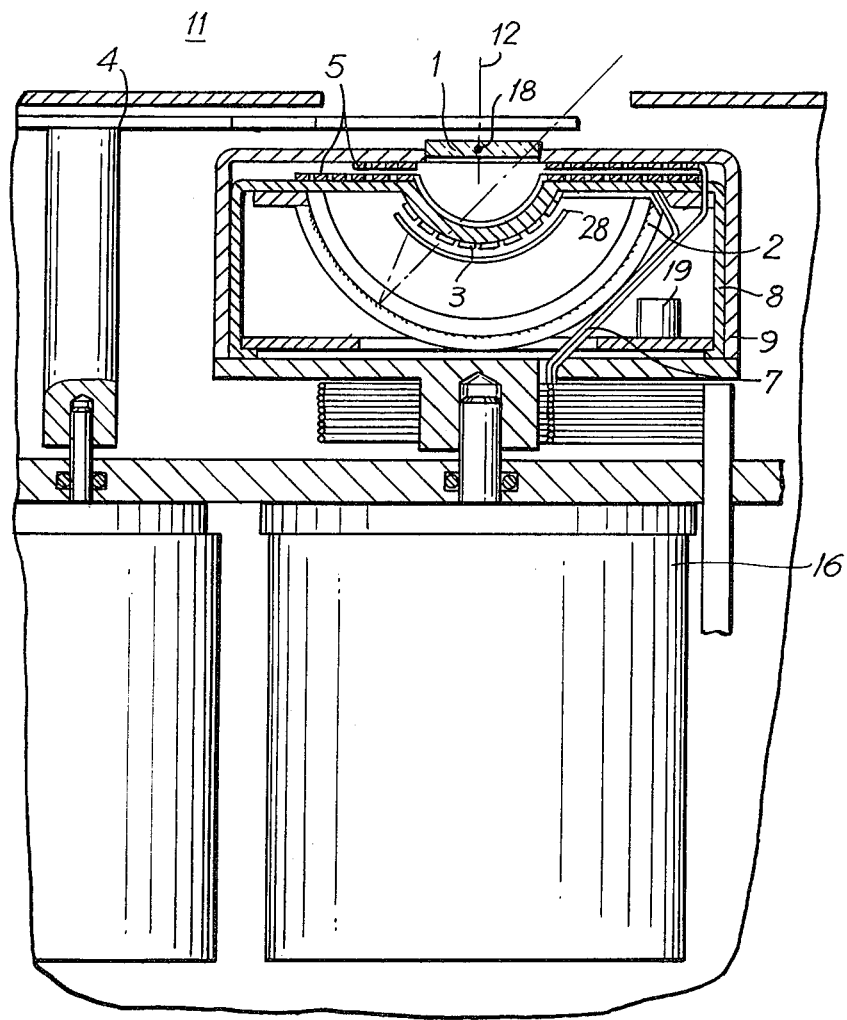
FIG. 1 is a fragmentary side view, partly in section, illustrating the portion of a meter containing the radiometer.
Figure 2:
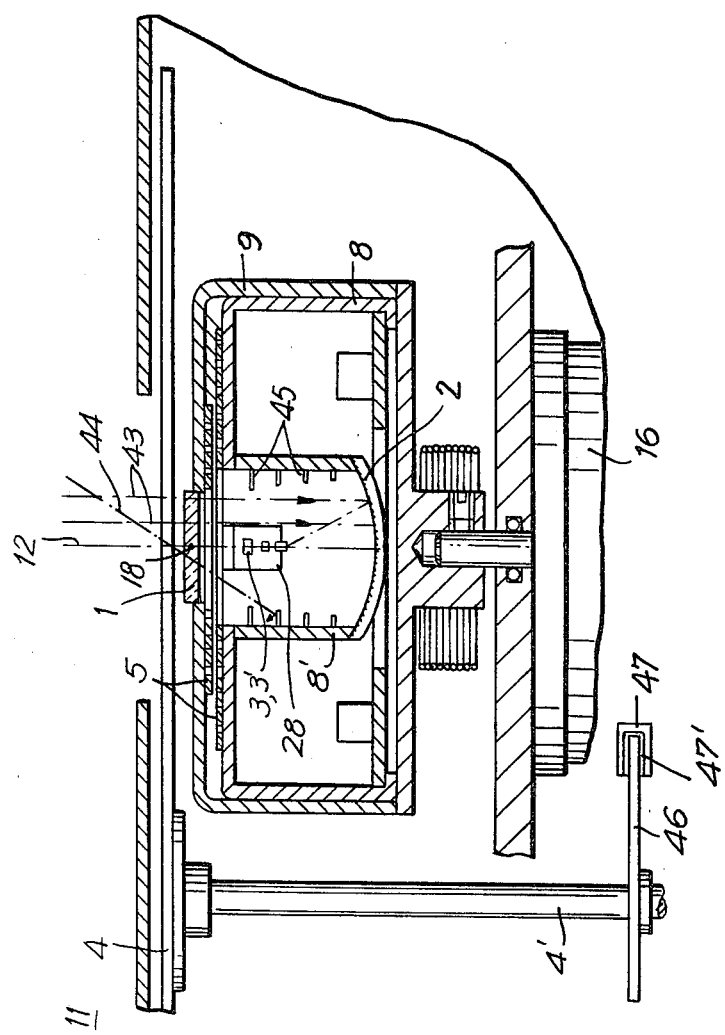
FIG. 2 shows the device of FIG. 1 turned through 90° with reference to its axis of symmetry.
Figure 3:
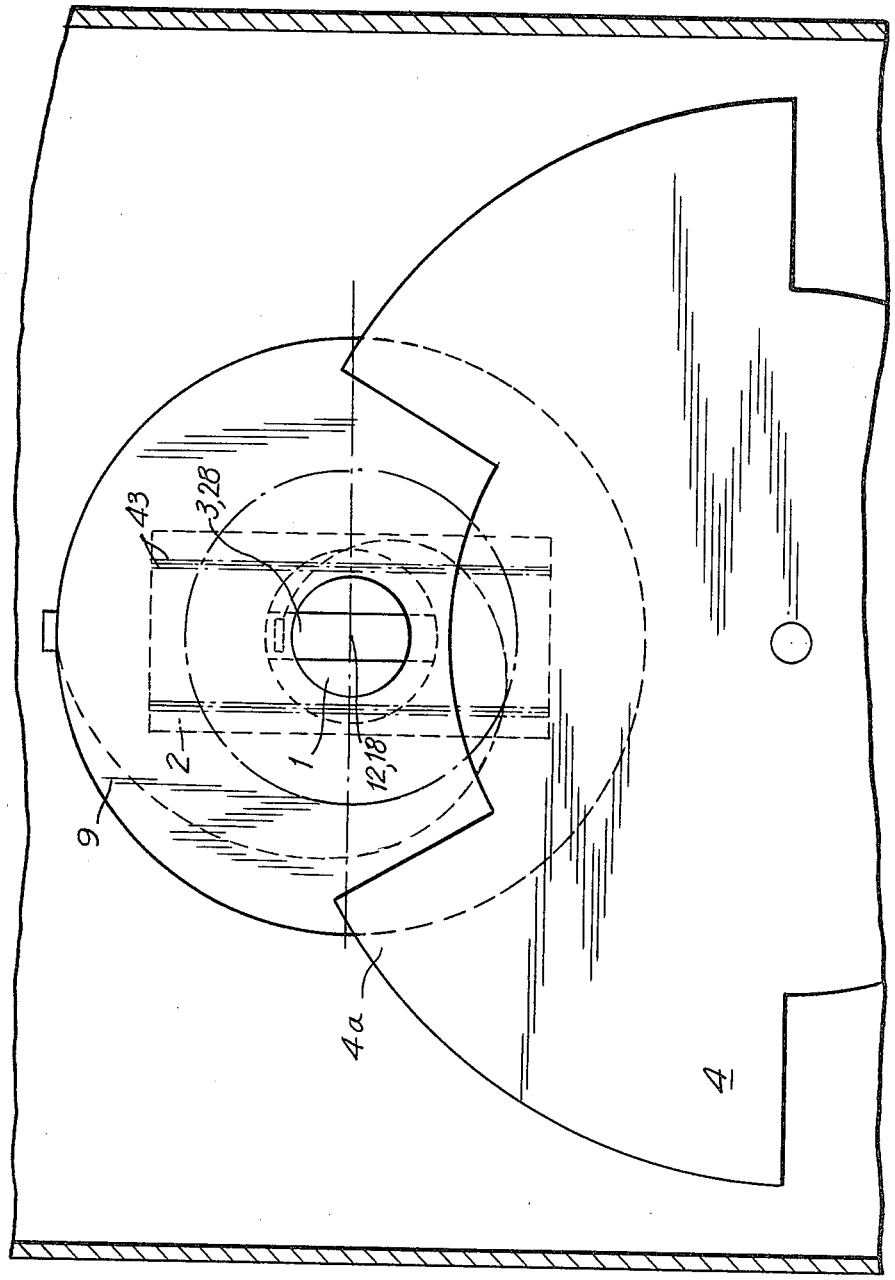
FIG. 3 is an enlarged top-plan detail view of FIG. 2.

Illustrated in FIGS. 1-3 is a radiometer 11, which has a concave part-spherical mirror 2, the open side of which faces the sky when the device is in use. A carrier 8 is provided having a portion which in the region of the mirror is concentric thereto; at the inner side of the carrier 8, at opposite sides of the optical axis 12 and facing the mirror 2, there are mounted one or more rows of photoelectric converters 3. The carrier 8 is configured as a housing and carries at its side opposite the converters 3 the mirror 2, thus fulfilling at the same time the function of a mechanically rigid connector between the converters 3 and the mirror 2.

When the radiometer is in operation, it turns about its optical axis 12 and the converter 3 scan the sky area which is subdivided into individual reproduction sections. The overlapping of the view fields which would otherwise occur, is prevented by a slot-type diaphragm arranged immediately ahead of the converters 3 and also arranged on a concentric circle. All elements mentioned thus far, as well as the pre-amplifier 50 associated with the converters 3 (see FIG. 4) are surrounded by a housing 9 on the outer side of which the cable 7 are mounted, which lead to the converters 3, respectively to the heating elements 5 therefore. Reference 16 identifies diagrammatically the drive unit for the radiometer, which is not illustrated in detail because it forms no part of the invention and is known per se in the art.

The housing 9 is provided with a window 1 which is located opposite the open side of the mirror 2. In fact, the geometric center of the window 1, which is preferably of circular outline, coincides with the center of curvature 18 of the concave mirror 2. As considered in the direction of incoming radiation, the center of curvature 18 is located immediately behind the interrupter disk 4 (see FIG. 3). The radiation entering through the window 1 is identified with reference 43 and 44 in FIG. 2; however, only the radiation 43 which reaches the mirror 2 is desired. The dispersed radiation 44 which impinges laterally of the radiation 43 results in uncontrollable refractions and it is therefore desired to prevent its access to the mirror 2. This is achieved by means of webs 45 which are secured in or on the carrier roll 8' at mutually opposite locations and extend normal to the optical axis 18. The edges of these webs which face towards the converters 3 are recessed in a steplike manner as considered in the direction of movement of the incoming radiation. The side of the interrupter disk 4, which faces towards the window is made to be reflective, so that in alternation with the radiation 43 which passes through the window 1 and is reflected by the mirror 2 onto the converters 3, a reference radiation is formed which is emitted by the converters 3 which are kept at a constant temperature with the aid of heater 5, and which is reflected back onto the converters 3 by the reflective side of the interrupter disk 4.

The alternating current resulting from the radiation received by the converters 3 has an approximately rectangular wave shape. Its basic wave amplitude is a known function of the temperature difference of the measured radiation and the reference radiation. The frequency of the converter signals is thus equal to the number of revolutions of the interrupter disk 4 times the number of interrupter disk lobes 4A.

The basic wave amplitude of the electrical signal at the converters 3 is determined with the aid of an additional electrical reference signal of constant amplitude and pure sine-wave shape; this signal has a defined phase position and a frequency corresponding to that of the interrupter disk 4. A reference disk 46 is rigidly connected for rotation with the interrupter disk 4 via the shaft 4'. The reference disk 46 is of transparent material (e.g. glass or an appropriate synthetic plastic material) and provided with a coding in form of opaque areas. To obtain the reference signal, the disk 46 is scanned via the receiver 47 and for this purpose turns in the cutout 47' which may for example be U-shaped. In the present exemplary embodiment, the receiver 47 is constructed as an electric eye, i.e. a light beam and a receiver for the same. In other possible embodiments, however, the scanning can be affected magnetically or in other suitable manner known to those skilled in the art. The electrical signal produced in the receiver 47 is amplified in the integrated circuit 48 (FIG. 4), and limited, and is subsequently demodulated in the integrated circuit 49 which is connected following the circuit 48. The limitation assures at the output of the demodulator 49 a signal of constant amplitude. The coding on the reference disk 46 is so selected that the demodulated signal is of purely sine-wave shape.

The rigid connection of the reference disk and the interrupter disk predetermines the phase position of the reference signal with reference to the phase position of the signal produced at the converters. Both signals have the same zero passes. To determine the electrical signal value equivalent to the radiation difference, the phase detector 51 is used, e.g. in form of a multiplier circuit. The signal produced at the converter sleeve is, as already mentioned, approximately rectangular in wave shape and can be reproduced by the equation 1:

$$u_d(t) = A \sin \omega t + B \sin 3\omega t + C \sin 5\omega t + \ldots \quad (1)$$

wherein
$u_d(t)$ = momentary detectorsignal
$\omega = 2f$
$f$ = interruptor frequency
A, B, C etc. = amplitudes of the different Frequencies, with A being searched for The reference signal is determined by the equation 2:

$$u_r(t) = R \sin(\omega t + \theta) \quad (2)$$

$$u_d(t) \cdot u_r(t) = R/2[A\cos\theta - A\cos(2\omega t + \theta) + B\cos(2\omega t - \theta) - B\cos(4\omega t + \theta) + \ldots] \quad (3)$$

The amplitude R and the phase angle $\theta$ are constant. The value $\theta$ is determined by the angular position of the reference disk 46 relative to the interrupter disk 4.

If $\theta = 0$ and the signal is passed through a low-pass filter having an upper frequency limit $f_G < 2\omega t$, one obtains a direct current which is characterized by the equation 4:

$$u_d(t) \cdot u_R(t) - k \cdot A \ldots \quad (4)$$

Since k is known, this can be taken into account at the amplification so that subsequently the desired final result A is obtained. As already mentioned, the reference signal must be purely of sine-wave form so that direct voltage is obtained only via the basic wave according to equation 3. The constant amplitude of the reference signal is necessary in order to assure that k in the equation 4 remains absolutely constant.

The signal-to-noise ratio is determined by the band width of the low-pass filter 52 which may be far below one Herz. A shifting of the frequency limit by changing of the structural components, temperature values and the like will result in only minimum changes of the signal-to-noise ratio, whereas the amplitude of the direct current is not influenced. Changes in the net frequency i.e. in the frequency of the currents in that used to operate the device, have no influence because the reference signal is synchronised to the detector signal.

In dependence upon the particular application, the radiometer is to receive radiations of a certain part of the spectrum or of several parts of the spectrum and is not to receive radiations from other parts of the spectrum. This is possible directly at the converter 3 (see FIG. 2) and/or at the inlet window 1 by the use of interference layers 3'.

FIG. 4 shows that pre-amplifier 50 with adjustable amplification are connected in circuit behind the converters 3, shown in FIGS. 1-3. The output signal is multiplied in order to determine the electrical signal value equivalent to the radiation difference; this multiplication takes place in the phase detector 51 with the reference signal and subsequently the resulting signal is made to pass through the low-pass filter 52 at the output of which a direct current according to equation 4 is obtained. The constant k of this equation as well as the differential sensitivity (volt/watt) of the converters 3 is set with the aid of the adjustable pre-amplifier 50.

The device 60 shown in FIGS. 1-3 is a stepper motor which is connected with the housing 9 and turns the same in steps of uniform length until the housing has passed through an angle of rotation of 180°, whereupon it returns in the opposite direction. In each position of the housing the temperature-equivalent direct voltages are scanned at the n outputs of the low pass filters 52 by means of the electronic multiplexer 53, and passed on to the analog-digital converter 60 which is connected in series with it.

In the embodiment illustrated herein, the converter-signal electronic 50-52 is provided for each individual converter 3, in order to assure that the transient state of the filters 52 and the time constant of the converters 3 need be awaited only once per stepped position before the measuring signal becomes stable at the filter output. In this manner the shortest possible readout time is obtained. However, although not illustrated in the drawing it is perfectly possible to have longer time periods occur or to accept them. In such a case, only one multiplier 51 and one low-pass filter 52 are required and the multiplexer 53 is connected in circuit ahead of them.

To return to the present embodiment, it is noted that after each step the stepper motor 16 remains for a brief time period in the new position, due to the operation of its motor control 57 (FIG. 4). This operating ratio is obtained by a counting of the pulses from the clock 54 in that the counter 55 produces a single advancing-step pulse after it has counted a predetermined number of clock pulses. The logic circuit 56 switch is connected between the motor control 57 and the counter 55 changes the direction of rotation as soon as the predetermined number of steps has been carried out. The limits switch 58, which is connected between the counter 55 and the logic circuit 56 furnishes command signals to the logic circuit 56 in the event the motor 16 should go out of step and thus actuate the limit switch. At the same time, as the direction of rotation of the stepper motor 16 is reversed, the counter 55 is zeroed, i.e. returned to its starting position.

After each of the steps described hereinbefore, the logic circuit 56 yields to the clock 59, the command signal to pass n number of pulses via the input 59' to the multiplexer 53. The n values for each position are converted in the analog to digital converter 60 into digital values and supplied to the threshold comparators 64, 65 and 66 of the circuit shown in FIG. 4. In the exemplary embodiment, the threshold value $S_3$ in the comparator 66 corresponds to the coldest temperature of a high cloud. The threshold value $S_2$ in the comparator 65 is lower than the value of $S_3$ and corresponds to the coldest temperature of a medium-high cloud, whereas the threshold value $S_1$ of the comparator 64 is in turn lower than the value of $S_2$ and corresponds to the coldest temperature of a low cloud.

The threshold values of the three aforementioned groups of clouds at different heights are dependent upon the zenith angle of the individual converters 3 in the optical system. This dependency is compensated by the zenith weighting device 63 which sets the threshold values in correspondence with the associated zenith angle of the signal present at the input 64', 65' and 66', of the comparators 64-66 respectively. The control of the device 63 is effected via the counter 61 which repeatedly counts the 1 to n clock pulses of the clock 59, which is connected in circuit between in the logic circuit 56 and the multiplexer 53, respectively the analog to digital converter 60, in order to pass on the associated threshold values $S_1$, $S_2$ and $S_3$ to the comparaters 64-66, respectively. This comparators have at their outputs the logical condition "1" or "0", if the associated threshold value is or is not exceeded in downward direction. The common further logic circuit 67 connected with the outputs has in turn one output each for low clouds (TB), medium clouds (MB) and high clouds (HB).

A logical "1" at one of these outputs indicates that clouds are present at the corresponding height range. FIG. 5 is a table representing the logic 67, i.e. associating the cloud condition with the differnt possibilities for the threshold values.

The cloud surface reproduced at the individual convertors 3 depends upon the respective picture angle and the respective zenith angle of these convertors 3. Different area segments of the reproduced area of sky are accounted for in determination of the cloud cover by the use of the device 62 which is a surface weighting device. The association is determined by the counting value of the counter 61, at the output 61' of which the surface weighting device 62 is connected. Its output leads to the clock 71 which in this manner receives the command to pass a predetermined number of clock pulses via the input 68'' 69'' and 70'' to the associated gating circuits 68, 69 and 70, respectively. If a logic "1" is present at the input 68', 69' and 70', while the clock 71 furnishes pulses to the inputs 68'', 69'' and 70'', then clock pulses are admitted into the corresponding gating circuits and counted in the counter 72 for low cloud cover, 73 for medium high cloud cover and 74 for high cloud cover; this counting is in eighths. A value of 8/8 indicates full cloud coverage at the corresponding height. The common counter 71 which is connected between the gating circuits 68–70 and their associated counters 72–74 counts all height ranges together and indicates the total cloud cover in eighths. The outputs of all counters 72–75 are then also connected with an indicator 76–79 where the result is optically reproduced, for example in form of a segment indication. Of course, other ways of providing an optical representation of the result are also feasible.

While the invention has been described hereinbefore with reference to an exemplary embodiment, it is to be understood that the invention is not limited to this embodiment and that the scope of the appended claims is intended to embrace all such modifications as will offer themselves to those having skill in the art.

What is claimed is:

1. A radiometer for measuring heat radiating from a defined spacial area, comprising a hollow mirror shaped to resemble a segment of a sphere and mounted for turning movement about its optical axis; a plurality of photoelectric convertors mechanically coupled with said mirror and arranged in the path of rays reflected by the same; a turntable interruptor disk interposed ahead of said mirror in the path of incident radiation and having a reflecting side facing towards the mirror; means for producing a reference signal which is coupled in phase-locked relationship with the rotation of said disk; heating means for heating said convertors; a housing surrounding said mirror, said convertors and said heating means and having a wall located ahead of said mirror and provided with an incident-light window located on said optical axis inwardly of said interruptor disk and arranged on the center of curvature of said mirror; and circuit means comprising amplifiers connected to receive signals from said convertors, a rectifier circuit including a phase-detector circuit controlled by said reference signal and a low-pass filter circuit receiving signals from said rectifier circuit, threshold value comparators and a multiplexer operative to sequentially supply the rectified signals to said threshold value comparators; said reference-signal producing means comprising an auxiliary disk coupled in phase-locked relationship with said interrupter disk and provided with reference indicia, and a detector responding to said reference indicia by producing said reference signal; said interrupter disk including a drive having a rotary drive shaft, and said auxiliary disk being mounted on said drive shaft for rotation therewith; said auxiliary disk being of transparent material and said indicia being constituted by opaque portions of said auxiliary disk for coding, said detector having an electric eye circuit a light beam of which is interrupted by said opaque portions during turning of the auxiliary disk; an amplifier/-limiter and a demodulator connected in circuit subsequent to said detector so as to produce a pure sine-wave reference signal of substantially constant amplitude; and wherein said phase-detector circuit comprises a plurality of multipliers; said reference signal having a defined phase position and a frequency corresponding to that of said interrupter disk; coding on the said auxiliary disk being arranged so that the demodulated signal has a pure sine-wave shape, said auxiliary disk being rigidly connected for rotation with said interrupter disk for predetermining the phase position of the reference signal relative to the phase position of the signal produced at the converters.

2. A radiometer as defined in claim 1, and said window being a circular window having a center which coincides with said center of curvature of said mirror; light traps located at mutually opposite sides of said converters to trap and suppress radiation which is not directed at the mirror; said light traps each comprising a wall provided with a plurality of ribs extending transverse to said optical axis, successive ribs having differential heights which decreases in the direction of radiation advancement; said phase detector circuit having a number of phase detectors, and said low-pass filter circuit having a number of low-pass filters, both corresponding to the number of converters, and each of said converters being connected with said multiplexer via one of said phase-detector tor and one of said lowpass filters; an analog-to-digital converter interposed in circuit between said multiplexer and said threshold value comparators and a clock for synchronizing the operation of said multiplexer and of the analog to digital converter with the rotation of said mirror; the threshold values of said theshold value comparators being selectable in accordance with the zenith angle associated with the respective multiplexer-selected converter; a discriminator circuit for weighting the output signals originating from the respective converters in dependence upon the size of the viewing area associated with different ones of said converter.

* * * * *